(12) United States Patent
Feng et al.

(10) Patent No.: US 10,857,914 B2
(45) Date of Patent: Dec. 8, 2020

(54) LOCKING DEVICE AND MOTOR VEHICLE SEAT ROTATION MECHANISM

(71) Applicant: Adient Engineering and IP GmbH, Burscheid (DE)

(72) Inventors: Qingwei Q. Feng, Shanghai (CN); Dahai Qian, Shanghai (CN); Shuai Xu, Shanghai (CN); Feixiang Zhu, Shanghai (CN); Xun Tan, Shanghai (CN)

(73) Assignee: Adient Engineering and IP GmbH, Burscheid (DE)

( * ) Notice: Subject to any disclaimer, the term of this patent is extended or adjusted under 35 U.S.C. 154(b) by 68 days.

(21) Appl. No.: 16/200,967

(22) Filed: Nov. 27, 2018

(65) Prior Publication Data

US 2019/0160976 A1    May 30, 2019

(30) Foreign Application Priority Data

Nov. 28, 2017   (CN) ..................... 2017 2 1616217 U (51) Int. Cl.
*B60N 2/14* (2006.01)
*B60N 2/427* (2006.01)

(52) U.S. Cl.
CPC ......... *B60N 2/146* (2013.01); *B60N 2/42736* (2013.01)

(58) Field of Classification Search
CPC .......... B60N 2/146; B60N 2/933; B60N 2/06; B60N 2002/022; B60N 2002/952; B60N 2/42736
USPC .......... 248/425, 429, 430; 70/308, 309, 318; 297/344.22, 344, 23, 344.24; 296/65.13, 296/65.14, 65.15
See application file for complete search history.

(56) References Cited

U.S. PATENT DOCUMENTS

| | | | |
|---|---|---|---|
| 3,338,622 A | | 8/1967 | Bachmann |
| 4,844,543 A | * | 7/1989 | Ochiai ..................... A47C 3/18 297/344.26 |
| 5,702,084 A | * | 12/1997 | Carnahan ............. F16M 11/041 248/415 |
| 5,720,462 A | * | 2/1998 | Brodersen .............. B60N 2/143 248/425 |

(Continued)

FOREIGN PATENT DOCUMENTS

| CN | 1189343 C | 2/2005 |
|---|---|---|
| CN | 103863151 A | 6/2014 |

(Continued)

*Primary Examiner* — Muhammad Ijaz
(74) *Attorney, Agent, or Firm* — Marshall & Melhorn, LLC (57) ABSTRACT

A locking device includes a locking pin mounting box, a locking pin, a locking spring, a handle and an unlocking tension spring. Respective ends of the locking pin pass through corresponding locking pin guide holes in lateral sides of the locking pin mounting box. A spring bearing boss is provided in a middle position of each locking pin. The locking spring surrounds the corresponding locking pin with one locking spring end in contact with one lateral side and another end in contact with the spring bearing boss. One end of the handle is hinged to a top side of the locking pin mounting box. The unlocking tension spring has one end connected to the handle and another end connected to an end of the locking pin that has passed through the first lateral side. In the locking device, the locking pin is inserted into a locking hole to achieve locking.

20 Claims, 11 Drawing Sheets

(56) References Cited

U.S. PATENT DOCUMENTS

| | | | |
|---|---|---|---|
| 7,726,294 B2* | 6/2010 | Collene | F24C 15/022 |
| | | | 126/197 |
| 9,085,245 B2* | 7/2015 | Haller | B60N 2/0825 |
| 9,180,792 B2* | 11/2015 | Haller | B60N 2/509 |
| 9,227,529 B2* | 1/2016 | Haller | B60N 2/062 |
| 10,500,988 B1* | 12/2019 | Faruque | B60N 2/146 |
| 2004/0195886 A1* | 10/2004 | Beatty | B64D 11/064 |
| | | | 297/344.22 |
| 2004/0238712 A1 | 12/2004 | Oh | |
| 2008/0163717 A1 | 7/2008 | Weber | |
| 2008/0211284 A1 | 9/2008 | Mutou et al. | |
| 2010/0102611 A1* | 4/2010 | Bunea | B64D 11/06 |
| | | | 297/344.23 |
| 2010/0276561 A1 | 11/2010 | Zacharias et al. | |
| 2011/0240820 A1 | 10/2011 | Napau et al. | |
| 2014/0167469 A1* | 6/2014 | Haller | F16C 33/3856 |
| | | | 297/344.12 |
| 2017/0297721 A1* | 10/2017 | Davis | B60N 2/06 |
| 2019/0126783 A1* | 5/2019 | Baccouche | B60N 2/0292 |
| 2019/0160976 A1* | 5/2019 | Feng | B60N 2/146 |
| 2019/0160977 A1* | 5/2019 | Feng | B60N 2/14 |

FOREIGN PATENT DOCUMENTS

| | | |
|---|---|---|
| CN | 106427682 A | 2/2017 |
| CN | 206186835 U | 5/2017 |
| DE | 4203150 A1 | 8/1993 |
| DE | 2007042595 A1 | 3/2009 |
| KR | 20110133689 A | 12/2011 |

\* cited by examiner

LOCKING DEVICE AND MOTOR VEHICLE SEAT ROTATION MECHANISM

CROSS REFERENCE TO RELATED APPLICATIONS

This application claims the benefit of priority under 35 U.S.C. § 119 of China Application 201721616217.0, filed Nov. 28, 2017, the entire contents of which are incorporated herein by reference.

TECHNICAL FIELD

The present invention relates to a locking device for a motor vehicle seat rotation mechanism.

BACKGROUND ART

Figure 1:
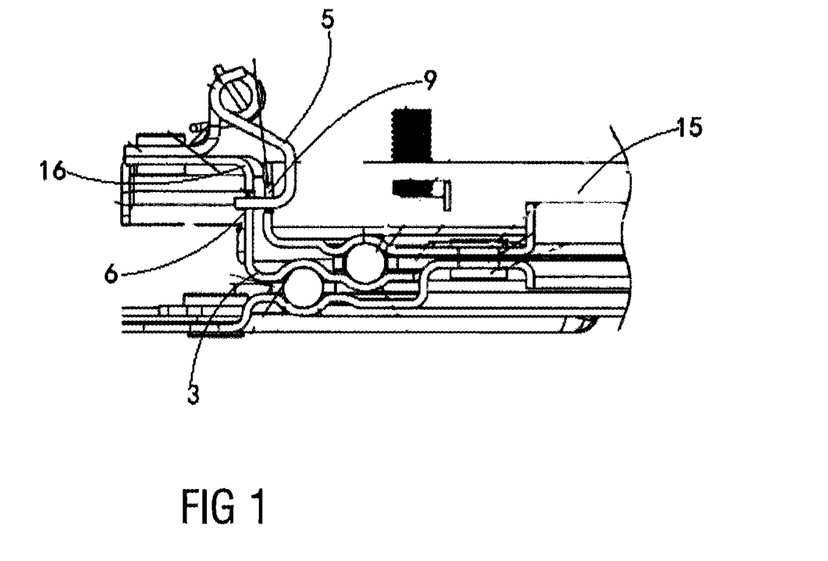
FIG. 1 is a schematic diagram of the locking device in CN106427682A in a state of use.

After adjustment of a seat rotation mechanism, a fixed plate and a moving plate are fixed by means of a locking device. Referring to FIG. 1, in the case of a locking device in CN106427682A, a locking claw 5 is flipped down and inserted into a locking hole 6 in a moving plate 3 and a locking hole 9 in a press plate 7 (the press plate 7 being connected in a fixed manner to a fixed plate 8). Since the locking claw 5 is mounted on the moving plate 3, and in order to arrange the locking hole 6 and the locking hole 9, edges of the moving plate 3 and the press plate 7 must extend upward, forming high folded edges 15 and 16, and resulting in a thick overall profile.

Figure 2:
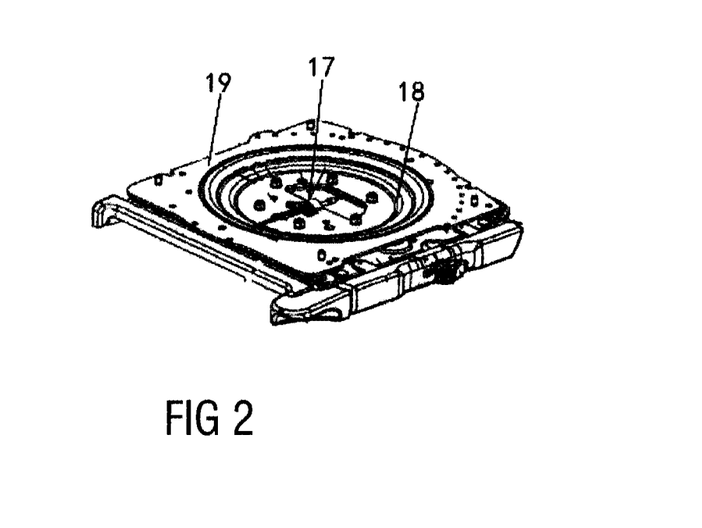
FIG. 2 is a schematic installation diagram of the locking device in CN103863151B.
Figure 3:
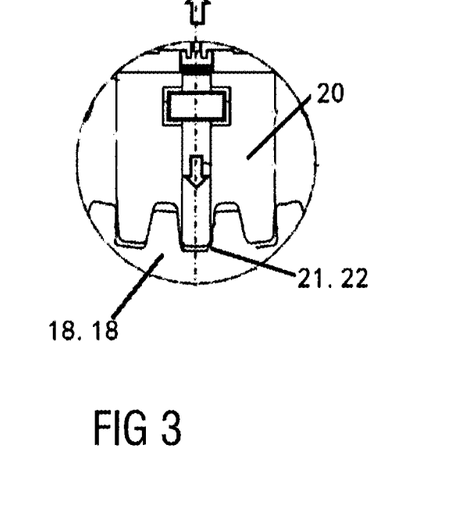
FIG. 3 is a schematic structural diagram of the locking device in CN103863151B.

Referring to FIGS. 2 and 3, in the case of another locking device disclosed in CN103863151 in the prior art, the locking device 17 is positioned between a fixed plate 18 and a moving plate 19, and a tooth-shaped element 20 is translationally inserted into and withdrawn from slots 21, 22 between the moving plate 19 and the fixed plate 18 to achieve locking. Such a design reduces the design height of the rotation mechanism.

Figure 4:
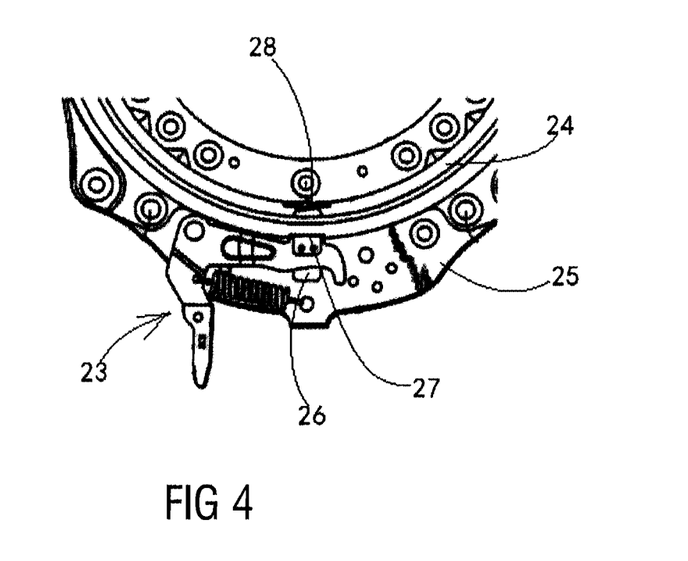
FIG. 4 is a schematic structural diagram of the locking device in the rolling rotation mechanism of CN1189343C.

Referring to FIG. 4, CN1189343C in the prior art discloses a similar locking device; the locking device 23 is also mounted between a fixed plate 24 and a moving plate 25. Specifically, a tooth-shaped element 26 is pulled manually, and the tooth-shaped element 26 is rotationally inserted into and withdrawn from locking holes 27, 28 between the moving plate 25 and the fixed plate 24 to achieve locking.

All of the locking devices in the known art described above employ one-piece claw-shaped or tooth-shaped members, i.e. are realized by jamming several successive protrusions in corresponding successive slots.

As is well known, due to the effects of manufacturing precision, in the case of a profile formed by multiple polygonal line segments at different angles, profiles in actual and theoretical states cannot be completely coincident; the greater the number of protrusions, the greater the degree of non-coincidence. Two protruding/recessed components are matched to each other, and this non-coincidence is a superposition relationship, hence zero-gap fitting is always impossible; this is the problem of so-called free play, and is an intrinsic characteristic of the structure.

In the known art, unlocking operations have poor ergonomics; passengers must turn a handle from one side to achieve unlocking, but lifting the hand to achieve unlocking would have a more natural feeling and require less effort. Although a rotary handle can be changed to a pull-up handle through the use of a harness for unlocking, this has the disadvantages of low transfer efficiency, and structural redundancy.

SUMMARY

A technical problem to be solved by the present invention is to provide, in response to the abovementioned technical problems affecting existing locking devices, an improved locking device in which a locking pin is translationally inserted into a locking hole to achieve locking. The height of a motor vehicle seat rotation mechanism is thereby reduced, and the present invention also has the characteristics of fast locking response and no gap.

Another technical problem to be solved by the present invention is to provide a motor vehicle seat rotation mechanism with an improved locking device.

A locking device is provided, comprising a locking pin mounting box at least having a top side, a first lateral side and a second lateral side, with the first lateral side and the second lateral side being disposed opposite each other, the top side being connected to a top edge of the first lateral side, the first lateral side and the second lateral side each being provided with at least one locking pin guide hole, and the locking pin guide holes in the first lateral side and the second lateral side having a coaxial relationship with one-to-one correspondence; at least one locking pin, in particular with a first end and a second end of the locking pin, passing through the corresponding locking pin guide holes in the first lateral side and the second lateral side respectively; and with a spring bearing boss being provided in a middle position of each locking pin; at least one locking spring surrounding the corresponding locking pin, with the locking spring having one end in contact with the first lateral side and another end in contact with the spring bearing boss; an unlocking handle, with one end of the unlocking handle being hinged to the top side of the locking pin mounting box; at least one unlocking tension spring, having one end connected to the unlocking handle and another end connected to the first end of the locking pin, the first end having passed through the first lateral side.

In an exemplary embodiment, the second end of the locking pin has a conical structure.

In an exemplary embodiment, the locking device is applied to a motor vehicle seat rotation mechanism, achieving locking between a fixed plate and a moving plate after adjustment of the motor vehicle seat rotation mechanism is complete.

In an exemplary embodiment, the locking device is mounted on a connecting plate in the motor vehicle seat rotation mechanism and located in a space between the connecting plate and an outer edge of a lower anti-detachment hook ring in the motor vehicle seat rotation mechanism.

In an exemplary embodiment, a locking hole is provided in the lower anti-detachment hook ring; when it is necessary to lock a seat to prevent rotation thereof, the locking pin in the locking device is inserted into the locking hole in a lower anti-detachment hook ring, to achieve locking between a connecting plate and the lower anti-detachment hook ring, and in turn achieve locking between the moving plate and the fixed plate; when it is necessary to rotate the seat, the locking pin in the locking device is pulled out of the locking hole in the lower anti-detachment hook ring.

In an exemplary embodiment, there are two said locking pins, and the locking hole in the lower anti-detachment hook ring is an obround locking hole; the two locking pins are simultaneously inserted into the obround locking hole, and conical surfaces on the two locking pins are in tight contact with arc edges at two ends of the obround locking hole.

Due to the adoption of the technical solution described above, the present invention employs a novel locking device, such that the locking pin is translationally inserted into the locking hole to achieve locking; the height of the motor vehicle seat rotation mechanism is thereby reduced, and the present invention also has the characteristics of fast locking response and no gap. In the locking device, the rotary handle unlocking is lifting handle unlocking, which is more in conformity with operating habits of users. The locking device of the present invention may also be used for locking between any other moving element and fixing element.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 5:
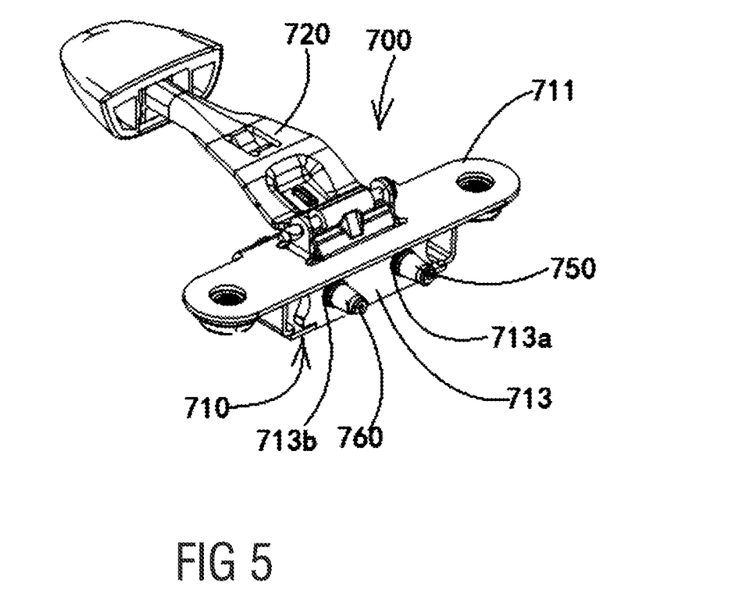
FIG. 5 is a schematic structural diagram of a locking device, viewed from one direction.
Figure 6:
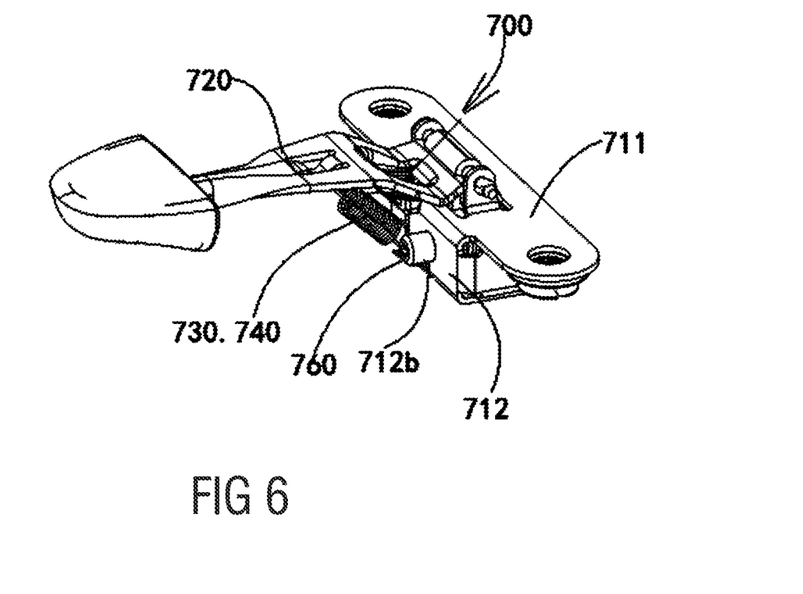
FIG. 6 is a schematic structural diagram of a locking device, viewed from another direction.

Referring to FIGS. 5 and 6, a locking device 700 shown in the figures comprises a locking pin mounting box 710 at least having a top side 711, a first lateral side 712 and a second lateral side 713, and also comprises an unlocking handle 720, two unlocking tension springs 730, 740, two locking pins 750, 760 and two locking springs 770, 780.

The first lateral side 712 and the second lateral side 713 are disposed opposite each other; the top side 711 is connected to a top edge of the first lateral side 712; the first lateral side 712 and the second lateral side 713 are each provided with two locking pin guide holes 712a, 712b, 713a, 713b; the locking pin guide holes 712a, 712b, 713a, 713b in the first lateral side 712 and the second lateral side 713 have a coaxial relationship with one-to-one correspondence.

A first end and a second end of the locking pin 750 pass through the locking pin guide hole 712a in the first lateral side 712 and the locking pin guide hole 713a in the second lateral side 713 respectively; a first end and a second end of the locking pin 760 pass through the locking pin guide hole 712b in the first lateral side 712 and the locking pin guide hole 713b in the second lateral side 713.

Spring bearing bosses 751, 761 are disposed in middle positions of both locking pins 750, 760; the two locking springs 770, 780 surround the locking pins 750, 760 respectively, with the locking springs 770, 780 each having one end in contact with the first lateral side 712, and the other ends being in contact with the spring bearing bosses 751, 761 respectively.

The first ends of the locking pins 750, 760, after passing through the first lateral side 712, are connected to the unlocking handle 720 via the unlocking tension springs 730, 740 respectively; the second ends of the locking pins 750, 760 have a conical structure. A first end of the unlocking handle 720 is hinged to the top side 711 of the locking pin mounting box 710.

The manner of installation and method of use of the locking device 700 are explained below, taking as an example the case where the locking device 700 is applied in a motor vehicle seat rotation mechanism.

Figure 7:
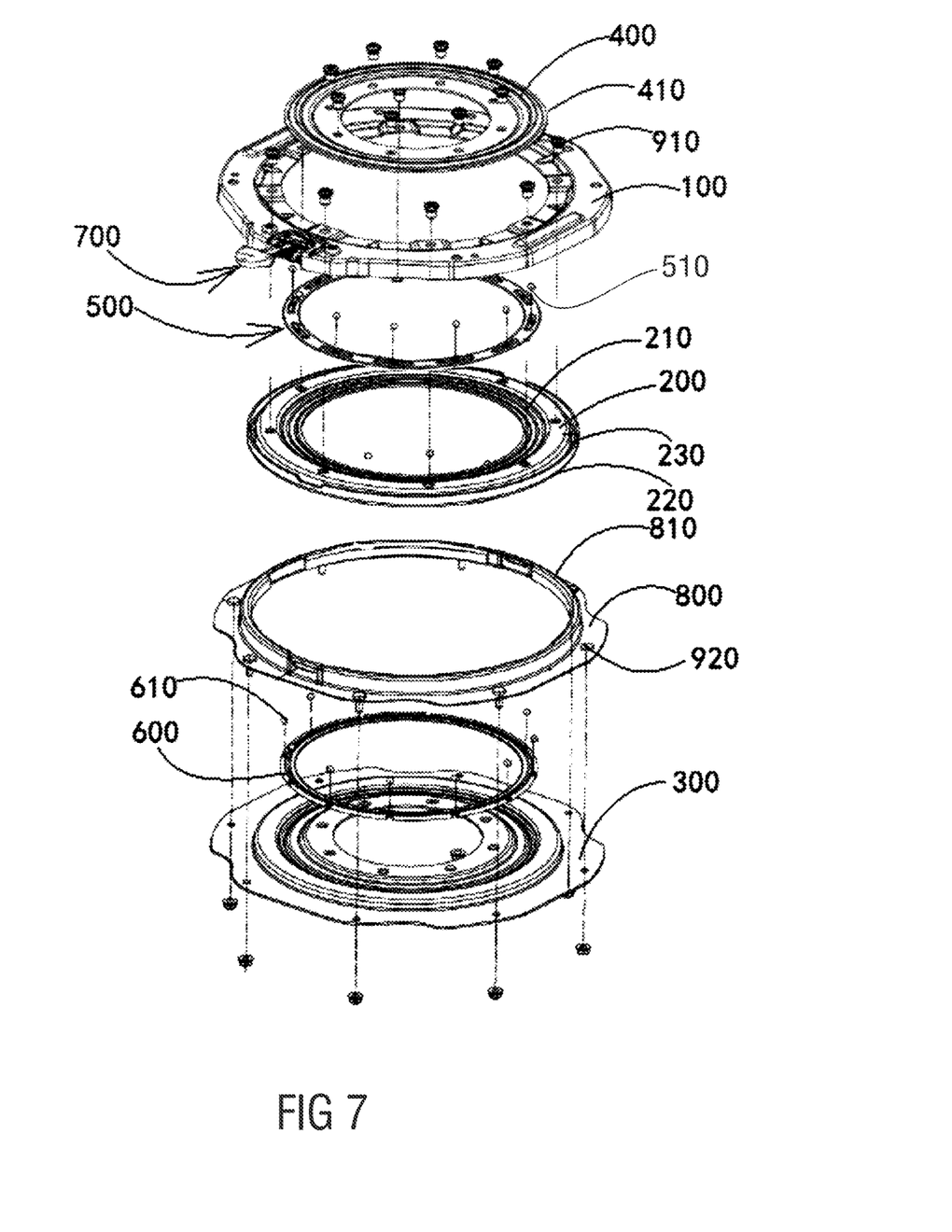
FIG. 7 is a schematic exploded view of a motor vehicle seat rotation mechanism.
Figure 8:
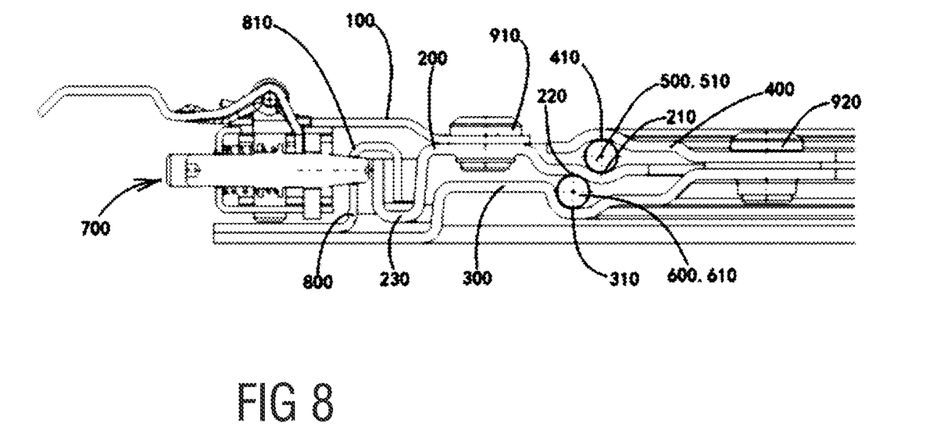
FIG. 8 is a schematic assembly diagram of a motor vehicle seat rotation mechanism.
Figure 9:
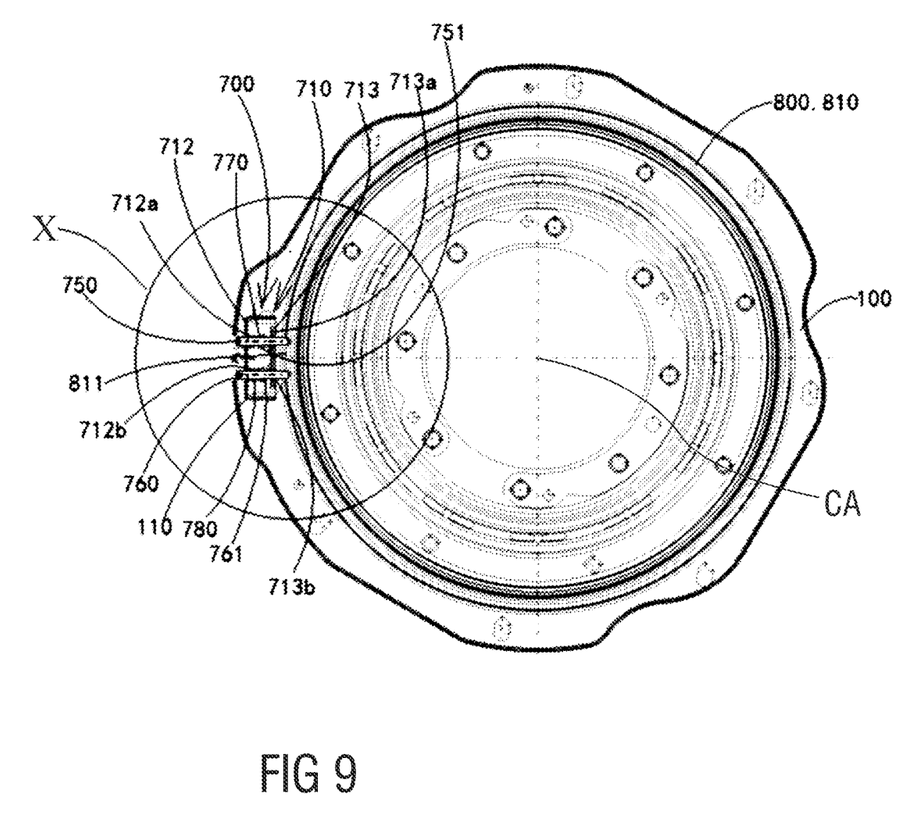
FIG. 9 is a top view of a locking device applied in a motor vehicle seat rotation mechanism, when in a locked state.
Figure 10:
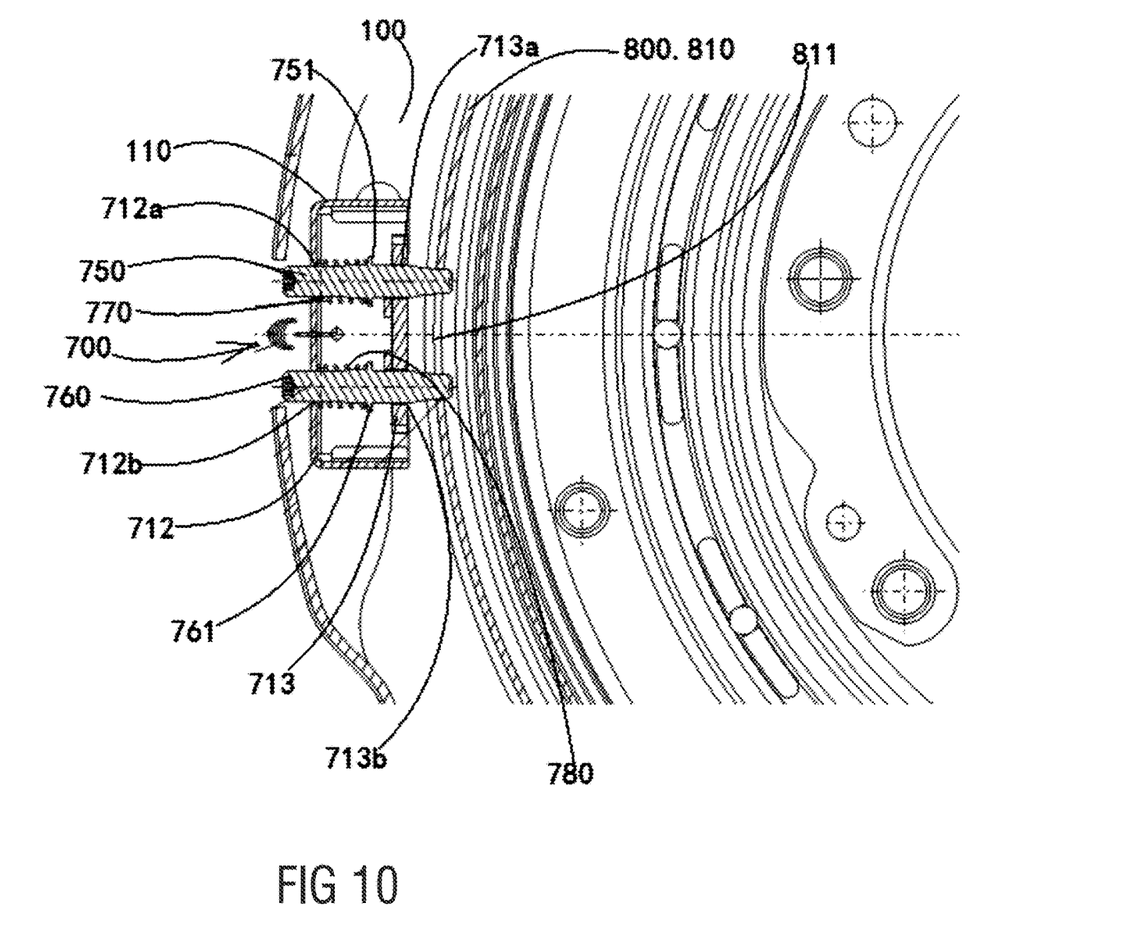
FIG. 10 is an enlarged schematic view of region I in FIG. 9.
Figure 11:
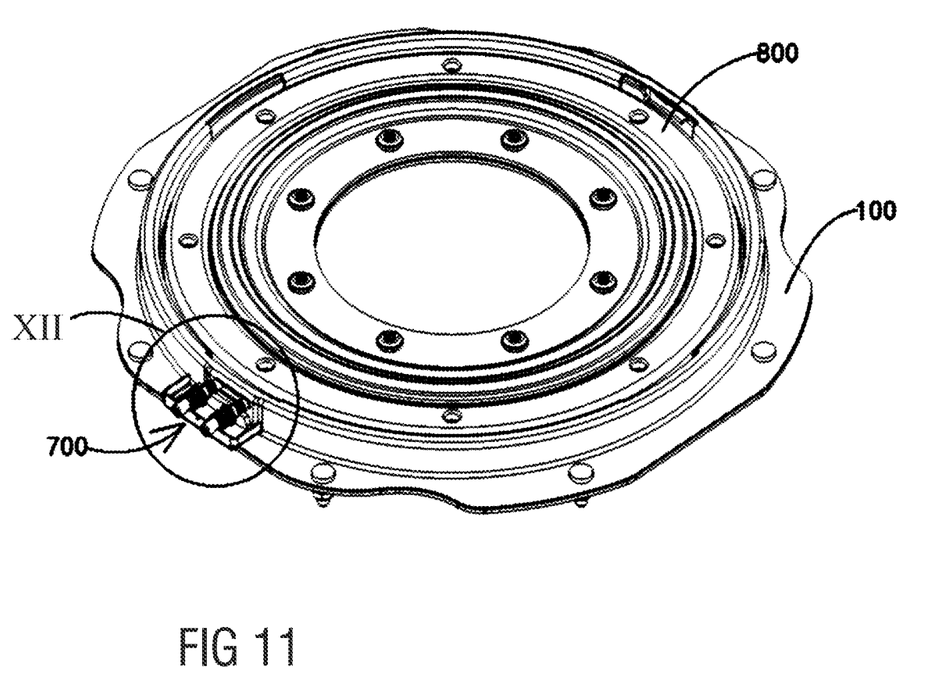
FIG. 11 is a three-dimensional schematic diagram of a locking device applied in a motor vehicle seat rotation mechanism, when in a locked state.
Figure 12:
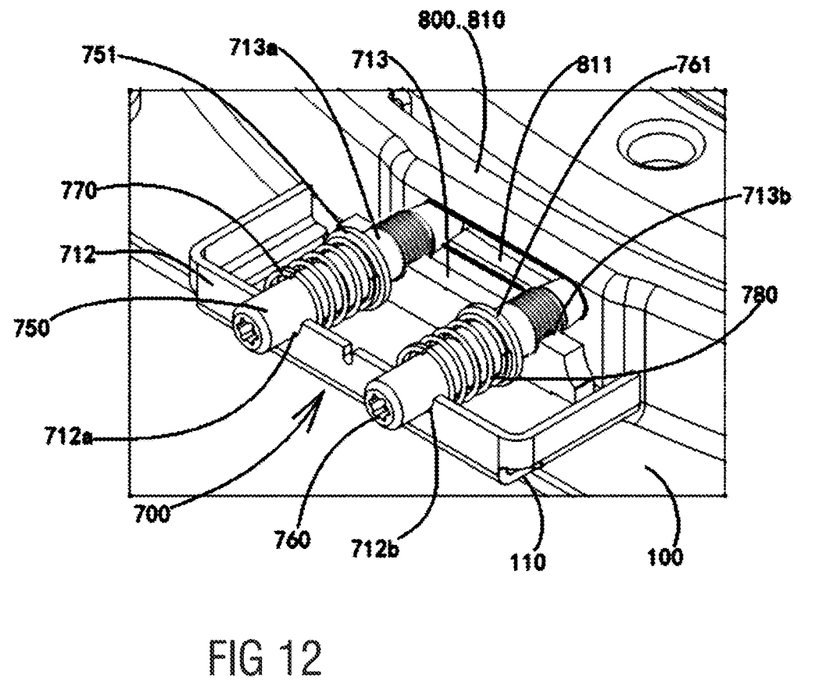
FIG. 12 is an enlarged schematic view of region I in FIG. 11.
Figure 13:
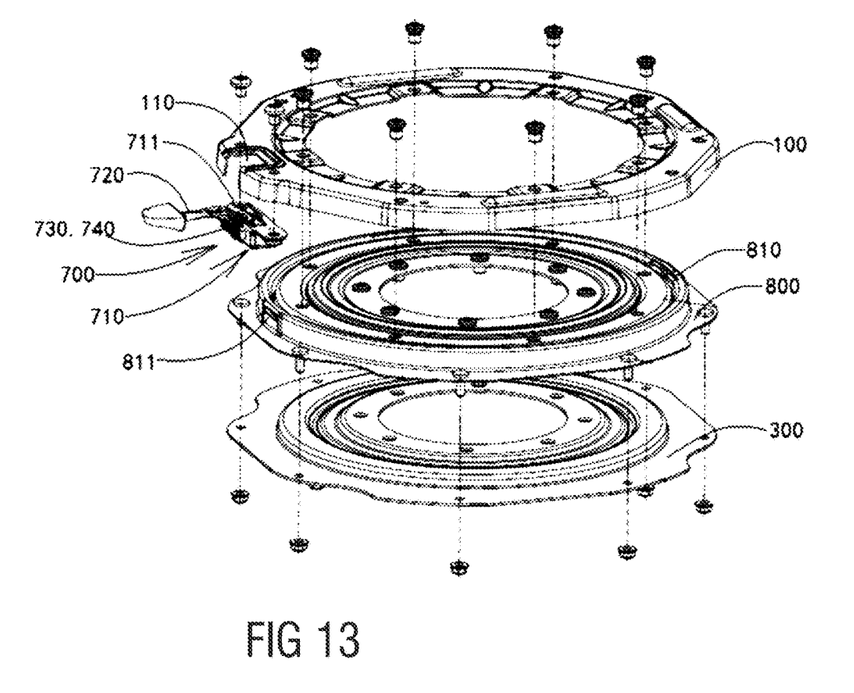
FIG. 13 is a schematic installation diagram of a locking device applied in a motor vehicle seat rotation mechanism.

Referring to FIGS. 7 and 8, the motor vehicle seat rotation mechanism shown in the figures comprises a connecting plate 100, a moving plate 200, a fixed plate 300, a press plate 400, an upper ball assembly 500, a lower ball assembly 600 and the locking device 700.

An annular upper ball track 410 is provided on the press plate 400; an annular upper middle ball track 210 and an annular lower middle ball track 220 are provided on the moving plate 200; an annular lower ball track 310 is provided on the fixed plate 300.

The connecting plate 100 is not only connected in a fixed manner to a seat (not shown in the figures), but also connected in a fixed manner to the moving plate 200 by means of rivets 910, with the moving plate 200 being located below the connecting plate 100. The fixed plate 300 is connected to an upper slide rail (not shown in the figures) in a seat slide rail assembly, and is located below the moving plate 200. The press plate 400 is located above the moving plate 200 and connected in a fixed manner to the fixed plate 300 by means of screws 920.

The upper ball track 410 on the press plate 400 and the upper middle ball track 210 on the moving plate 200 are vertically opposite one another; upper balls 510 in the upper ball assembly 500 are located between the upper ball track 410 on the press plate 400 and the upper middle ball track 210 on the moving plate 200, and are in rolling contact with both ball tracks.

The lower middle ball track 220 on the moving plate 200 and the lower ball track 310 on the fixed plate 300 are vertically opposite one another; lower balls 610 in the lower ball assembly 600 are located between the lower middle ball track 220 on the moving plate 200 and the lower ball track 310 on the fixed plate 300, and are in rolling contact with both ball tracks.

The motor vehicle seat rotation mechanism further comprises a lower anti-detachment hook ring 800, located between the connecting plate 100 and the fixed plate 300 and fixed to the fixed plate 300. An annular lower anti-detachment hook 810, having an inverted U-shape, is provided at an inner edge of the lower anti-detachment hook ring 800; an annular upper anti-detachment hook 230, having a U-shape, is provided at an outer edge of the moving plate 200; the lower anti-detachment hook 810 is placed over the upper anti-detachment hook 230, achieving mutual engagement. When such a structure is subjected to a separating force, the components are in a state whereby the more they are pressed, the tighter they become, instead of a state whereby the more they are pulled, the more open they become, as in a conventional design. At the same time, the lower balls 610 are in a state whereby the more they are enclosed, the tighter they become, instead of having the tendency to come out of the lower middle ball track 220 on the moving plate 200 and the lower ball track 310 on the fixed plate 300.

Referring to FIGS. 9 to 13, the locking device 700 is mounted on the connecting plate 100 and is located in a space between the connecting plate 100 and an outer edge of the lower anti-detachment hook ring 800; making use of the space between the connecting plate 100 and the outer edge of the lower anti-detachment hook ring 800 to mount the locking device 700 in this way effectively reduces the height H of the motor vehicle seat rotation mechanism.

A locking device mounting gap 110 is provided in a certain position on an outer periphery of the connecting plate 100; the top side 711 in the locking device 700 is inserted into the locking device mounting gap 110 and fastened by means of bolts 930. An obround locking hole 811 is provided at a suitable position of the lower anti-detachment hook 810 on the lower anti-detachment hook ring 800; the second ends of the locking pins 750, 760, after passing through the second lateral side 713, are simultaneously inserted into the obround locking hole 811.

Having the locking pins 750, 760 located in the space between the connecting plate 100 and the outer edge of the lower anti-detachment hook ring 800 can further reduce the height H of the motor vehicle seat rotation mechanism.

When it is necessary to lock the seat to prevent rotation thereof, the locking pins 750, 760 in the locking device 700 are inserted into the locking hole 811 in the lower anti-detachment hook ring 800, to achieve locking between the connecting plate 100 and the lower anti-detachment hook ring 800. Since the connecting plate 100 is connected in a fixed manner to the moving plate 200, and the lower anti-detachment hook ring 800 is connected in a fixed manner to the fixed plate 300, locking between the moving plate 200 and the fixed plate 300 can be achieved.

When it is necessary to rotate the seat, the unlocking handle 720 is lifted upward, and the two locking pins 750, 760 are pulled outward from the locking hole 811 in the lower anti-detachment hook ring 800, by means of the two unlocking tension springs 730, 740. After releasing the unlocking handle 720, the two locking pins 750, 760 can be reinserted, under the driving action of the locking springs 770, 780, into the locking hole 811 in the lower anti-detachment hook ring 800 to achieve locking. The two unlocking tension springs 730, 740 drive the unlocking handle 720 to its original position.

The present invention changes the claw-type locking in the prior art to an arrangement in which the two locking pins 750, 760 can be reinserted, under the driving action of the locking springs 770, 780, into the locking hole 811 in the lower anti-detachment hook ring 800 to achieve locking. An advantage of this arrangement is that a hole-and-shaft fit is the form that is most convenient for machining and matching, and satisfactory precision can be attained relatively cheaply.

The two locking pins 750, 760 can each extend and retract independently under the driving action of the locking springs 770, 780, whereas multiple protrusions on a one-piece engaging claw "enter and exit together", and complete locking can only be achieved if all of the protrusions enter all of the recesses, so the promptness of locking is inferior to that of the present invention.

Figure 14A:
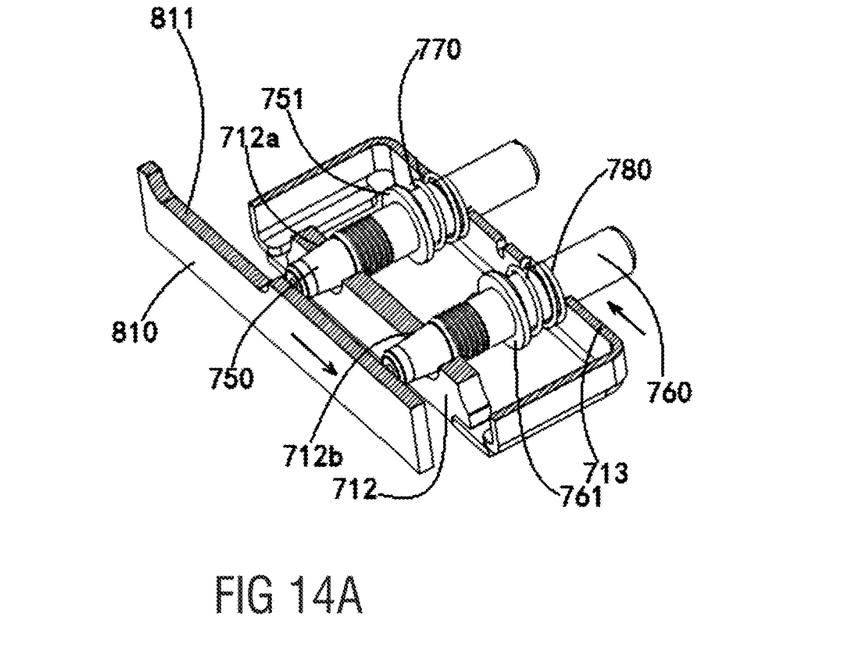
FIGS. 14a to 14c are schematic procedural diagrams of a locking device applied in a motor vehicle seat rotation mechanism, during entry of a locking pin into a locking hole.
Figure 14B:
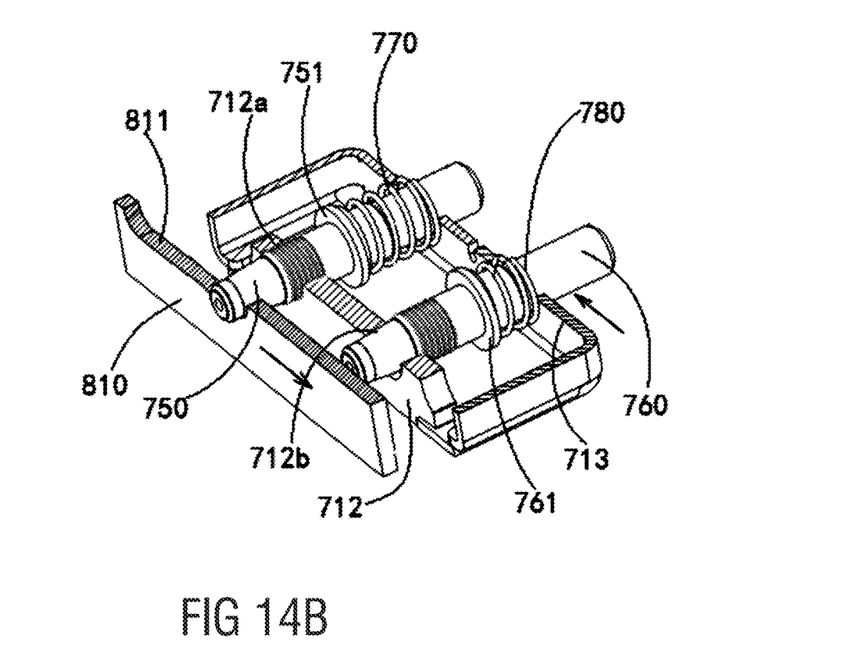
Figure 14C:
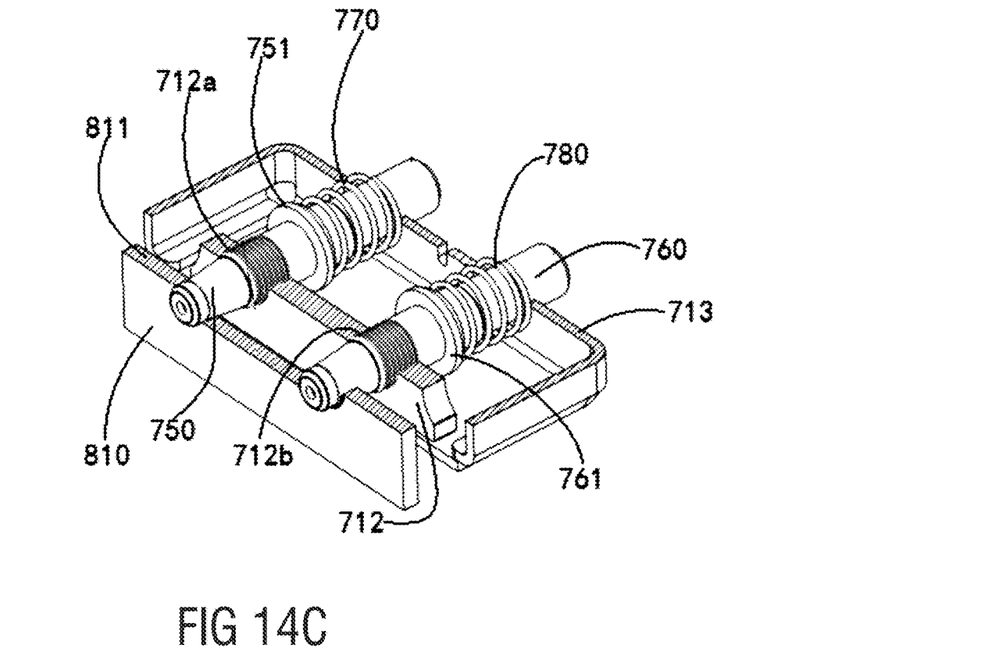

Referring to FIGS. 14a to 14c, in a rotating state, the second ends of the two locking pins 750, 760 are both in a retracted state and in contact with an outer surface of the lower anti-detachment hook 810 on the lower anti-detachment hook ring 800; when a locking position is reached, the locking pin 750 rotates to the position of the obround locking hole 811 first, and is inserted into the obround locking hole 811 under the pushing action of the locking spring 770; as the locking device continues to rotate relative to the fixed plate 300, the locking pin 760 also rotates to the position of the obround locking hole 811, and is inserted into the obround locking hole 811 under the pushing action of the locking spring 780. Once the second ends of both locking pins 750, 760 have been inserted into the obround locking hole 811, the locking device 700 can no longer move relative to the fixed plate 300, so locking is achieved.

Figure 15:
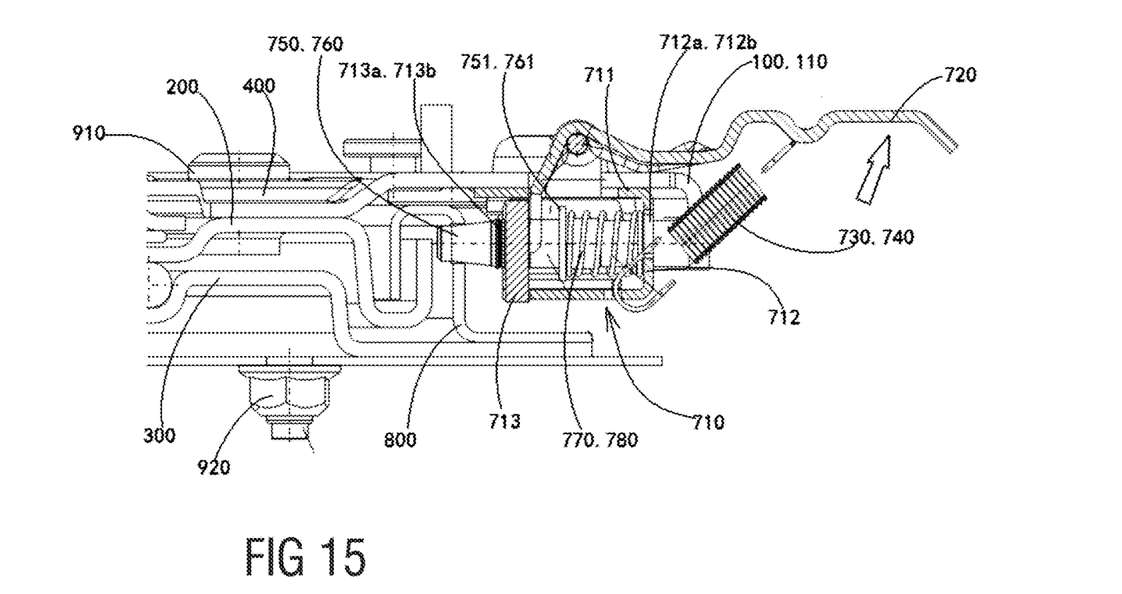
FIG. 15 is a schematic diagram of the state of a locking device in a motor vehicle seat rotation mechanism during unlocking.

Referring to FIG. 15, the invention changes the rotary handle in the prior art to the unlocking handle 720 which is lifted upward; the extension and retraction of the two locking pins 750, 760 are controlled by the unlocking handle 720; the unlocking handle 720 is lifted manually; the unlocking handle 720 rotates anticlockwise around a hinge shaft 721 of the unlocking handle and the top side 711; and the unlocking handle 720 pulls the two locking pins 750, 760 by means of the two unlocking tension springs 730, 740 such that the two locking pins are withdrawn outward from the obround locking hole 811. When the unlocking handle 720 is dropped, the two locking pins 750, 760 can be reinserted, under the driving action of the locking springs 770, 780, into the locking hole 811 in the lower anti-detachment hook ring 800 to achieve locking; the structure is very simple, and the pulling-up of the unlocking handle 720 is more in conformity with operating habits of users.

Figure 16:
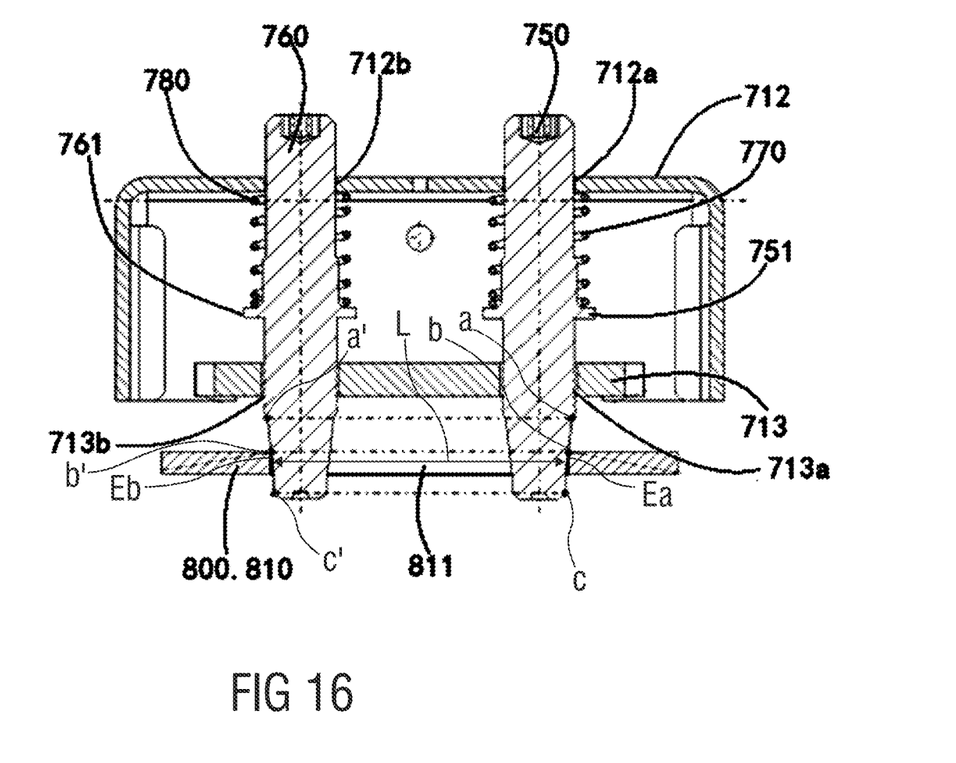
FIG. 16 is a schematic diagram of a state of locking between two locking pins and an obround locking hole for a locking device applied in a motor vehicle seat rotation mechanism.
Figure 17:
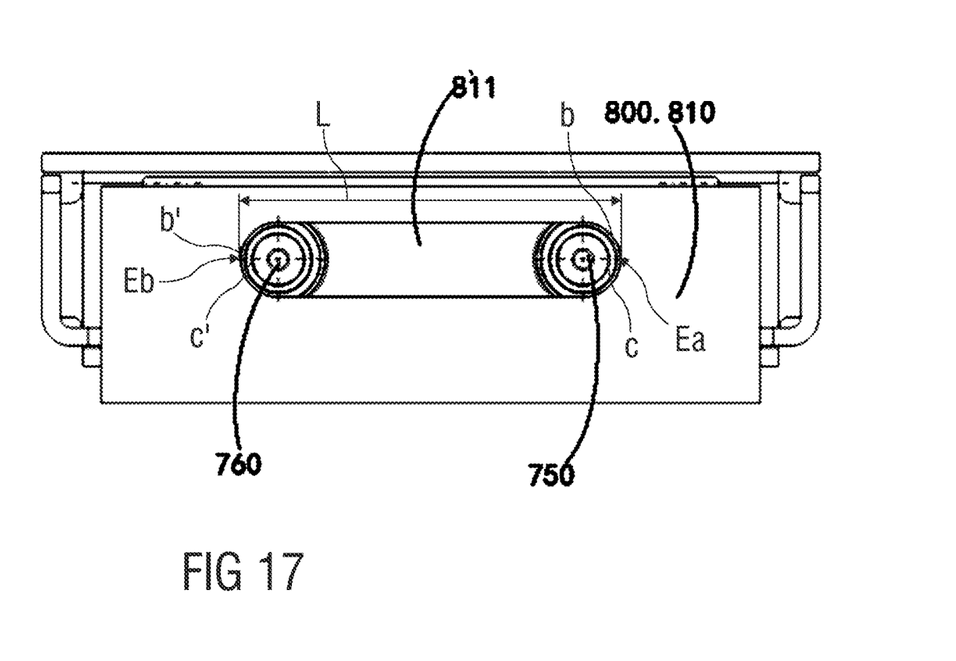
FIG. 17 is a schematic view of FIG. 16 in direction A.

Referring to FIGS. 16 and 17, the second ends of the two locking pins 750, 760 both have a conical structure; supposing that a length between two arc edges Ea, Eb at two ends of the obround locking hole 811 is L, a length of a line connecting guide points C, C' of the two locking pins 750, 760 is 0.8 mm less than the value of L, cone-shape starting points of the two locking pins 750, 760 are b, b', a length of a line connecting the cone-shape starting points b, b' of the two locking pins 750, 760 is 0.5 mm less than the value of L, cone-shape ending points of the two locking pins 750, 760 are a, a', a length of a line connecting the cone-shape ending points a, a' of the two locking pins 750, 760 is 1.2 mm greater than the value of L; thus, under the combined action of the two locking pins 750, 760, it can be ensured that some point between the cone-shape starting points b, b' and the cone-shape ending points a, a' of the two locking pins 750, 760 will be in tight contact with the arc edges Ea, Eb at the two ends of the obround locking hole 811, i.e. in a "zero" gap fit, so gaps are eliminated.

While specific embodiments of the invention have been shown and described in detail to illustrate the application of the principles of the invention, it will be understood that the invention may be embodied otherwise without departing from such principles.

What is claimed is:

1. A locking device comprising:
   a locking pin mounting box comprising a top side, a first lateral side and a second lateral side, the first lateral side and the second lateral side being disposed opposite each other, the top side being connected to a top edge of the first lateral side, the first lateral side and the second lateral side each being provided with at least one locking pin guide hole,
   wherein the at least one locking pin guide hole in the first lateral side is coaxial with the at least one locking pin guide hole in the second lateral side;
   at least one locking pin passing through the at least one locking pin guide hole in the first lateral side and the at least one locking pin guide hole in the second lateral side;
   a spring bearing boss provided in a middle position of the at least one locking pin;
   at least one locking spring surrounding the at least one locking pin, the locking spring having one end in contact with the first lateral side and another end in contact with the spring bearing boss;
   an unlocking handle comprising one unlocking handle end hinged to the top side of the locking pin mounting box; and
   at least one unlocking tension spring comprising one unlocking tension spring end connected to the unlocking handle and another unlocking tension spring end connected to a locking pin first end, the at least one locking pin extending through the first lateral side with the locking pin first end disposed outwardly thereof.

2. The locking device according to claim 1, wherein a locking pin second end has a conical structure.

3. The locking device according to claim 2, in combination with a motor vehicle seat rotation mechanism comprising a fixed plate and a moving plate, wherein the locking device is applied to the motor vehicle seat rotation mechanism achieving an unlocked state, allowing position adjustment of the moving plate relative to the fixed plate of the motor vehicle seat rotation mechanism and locking between the fixed plate and the moving plate after position adjustment is complete.

4. The locking device according to claim 3, wherein: the motor vehicle seat rotation mechanism further comprises a connecting plate and a lower anti-detachment hook ring; the locking device is mounted on the connecting plate and located in a space between the connecting plate and an outer edge of the lower anti-detachment hook ring.

5. The locking device according to claim 4, wherein:
   a locking hole is provided in the lower anti-detachment hook ring;
   the at least one locking pin is inserted into the locking hole in the lower anti-detachment hook ring to achieve locking between the connecting plate and the lower anti-detachment hook ring to provide locking between the moving plate and the fixed plate;
   the at least one locking pin is pulled out of the locking hole in the lower anti-detachment hook ring to achieve the unlocked state.

6. The locking device according to claim 5, further comprising another locking pin, wherein:
   the first lateral side and the second lateral side are each provided with another locking pin guide hole;
   the another locking pin guide hole in the first lateral side is coaxial with the another locking pin guide hole in the second lateral side;
   the another locking pin passes through the another locking pin guide hole in the first lateral side and the another locking pin guide hole in the second lateral side;
   the conical structure of the locking pin second end of the at least one locking pin defines a conical surface;
   the another locking pin has a locking pin second end having a conical structure defining a conical surface;
   the locking hole in the lower anti-detachment hook ring is an obround locking hole;
   the at least one locking pin and the another locking pin are insertable together into the obround locking hole,
   whereby the conical surfaces on the at least one locking pin and the another locking pin are in tight contact with arc edges at two ends of the obround locking hole.

7. The locking device according to claim 1 in combination with a motor vehicle seat rotation mechanism comprising a fixed plate and a moving plate, wherein the locking device is applied to the motor vehicle seat rotation mechanism achieving an unlocked state, allowing position adjustment of the moving plate relative to the fixed plate of the motor vehicle seat rotation mechanism and locking between the fixed plate and the moving plate after position adjustment is complete.

8. The locking device according to claim 7, wherein:
   the motor vehicle seat rotation mechanism further comprises a connecting plate and a lower anti-detachment hook ring;
   the locking device is mounted on the connecting plate and located in a space between the connecting plate and an outer edge of the lower anti-detachment hook ring.

9. The locking device according to claim 8, wherein:
   a locking hole is provided in the lower anti-detachment hook ring;
   the at least one locking pin is inserted into the locking hole in the lower anti-detachment hook ring to achieve locking between the connecting plate and the lower anti-detachment hook ring to provide locking between the moving plate and the fixed plate;
   the locking pin is pulled out of the locking hole in the lower anti-detachment hook ring to achieve the unlocked state.

10. The locking device according to claim 9, further comprising another locking pin, wherein:
    the first lateral side and the second lateral side are each provided with another locking pin guide hole;
    the another locking pin guide hole in the first lateral side is coaxial with the another locking pin guide hole in the second lateral side;
    the another locking pin passes through the another locking pin guide hole in the first lateral side and the another locking pin guide hole in the second lateral side;
    the at least one locking pin has a locking pin second end having a conical structure defining a conical surface;
    the another locking pin has a locking pin second end having a conical structure defining a conical surface;
    the locking hole in the lower anti-detachment hook ring is an obround locking hole;
    the at least one locking pin and the another locking pin are insertable together into the obround locking hole, whereby conical surfaces on the at least one locking pin and the another locking pin are in tight contact with arc edges at two ends of the obround locking hole.

11. A motor vehicle seat rotation mechanism comprising a locking device, the locking device comprising:
a locking pin mounting box comprising a top side, a first lateral side and a second lateral side, the first lateral side and the second lateral side being disposed opposite each other, the top side being connected to a top edge of the first lateral side, the first lateral side and the second lateral side each being provided with at least one locking pin guide hole,
wherein the at least one locking pin guide hole in the first lateral side is coaxial with the at least one locking pin guide hole in the second lateral side;
at least one locking pin passing through the at least one locking pin guide hole in the first lateral side and the at least one locking pin guide hole in the second lateral side;
a spring bearing boss provided in a middle position of the at least one locking pin;
at least one locking spring surrounding the at least one locking pin, the locking spring having one end in contact with the first lateral side and another end in contact with the spring bearing boss;
an unlocking handle comprising one unlocking handle end hinged to the top side of the locking pin mounting box; and
at least one unlocking tension spring comprising one unlocking tension spring end connected to the unlocking handle and another unlocking tension spring end connected to a locking pin first end, the at least one locking pin extending through the first lateral side with the locking pin first end disposed outwardly thereof.

12. The motor vehicle seat rotation mechanism according to claim 11, wherein a locking pin second end has a conical structure.

13. The motor vehicle seat rotation mechanism according to claim 12, further comprising:
a fixed plate; and
a moving plate,
wherein the locking device allows position adjustment of the moving plate relative to the fixed plate of the motor vehicle seat rotation mechanism and locking between the fixed plate and the moving plate after position adjustment is complete.

14. The motor vehicle seat rotation mechanism according to claim 13, further comprising:
a connecting plate; and
a lower anti-detachment hook ring, wherein the locking device is mounted on the connecting plate and is located in a space between the connecting plate and an outer edge of the lower anti-detachment hook ring.

15. The motor vehicle seat rotation mechanism according to claim 14, wherein:
a locking hole is provided in the lower anti-detachment hook ring;
the at least one locking pin is inserted into the locking hole in the lower anti-detachment hook ring to achieve locking between the connecting plate and the lower anti-detachment hook ring to provide locking between the moving plate and the fixed plate;
the locking pin is pulled out of the locking hole in the lower anti-detachment hook ring to achieve an unlocked state.

16. The motor vehicle seat rotation mechanism according to claim 15, wherein:
the locking device further comprises another locking pin;
the first lateral side and the second lateral side are each provided with another locking pin guide hole;
the another locking pin guide hole in the first lateral side is coaxial with the another locking pin guide hole in the second lateral side;
the another locking pin passes through the another locking pin guide hole in the first lateral side and the another locking pin guide hole in the second lateral side;
the conical structure of the locking pin second end of the at least one locking pin defines a conical surface;
the another locking pin has a locking pin second end having a conical structure defining a conical surface;
the locking hole in the lower anti-detachment hook ring is an obround locking hole; and
the at least one locking pin and the another locking pin are insertable together into the obround locking hole, whereby conical surfaces on the at least one locking pin and the another locking pin are in tight contact with arc edges at two ends of the obround locking hole.

17. The motor vehicle seat rotation mechanism according to claim 11, further comprising a fixed plate; and
a moving plate, wherein the locking device allows position adjustment of the moving plate relative to the fixed plate of the motor vehicle seat rotation mechanism and locking between the fixed plate and the moving plate after position adjustment is complete.

18. The motor vehicle seat rotation mechanism according to claim 17, further comprising:
a connecting plate; and
a lower anti-detachment hook ring,
wherein the locking device is mounted on the connecting plate and is located in a space between the connecting plate and an outer edge of the lower anti-detachment hook ring.

19. The motor vehicle seat rotation mechanism according to claim 18, wherein:
a locking hole is provided in the lower anti-detachment hook ring;
the locking pin is inserted into the locking hole in the lower anti-detachment hook ring to achieve locking between the connecting plate and the lower anti-detachment hook ring to provide locking between the moving plate and the fixed plate;
the locking pin is pulled out of the locking hole in the lower anti-detachment hook ring to achieve the unlocked state.

20. The motor vehicle seat rotation mechanism according to claim 19, wherein:
the locking device further comprises another locking pin;
the first lateral side and the second lateral side are each provided with another locking pin guide hole;
the another locking pin guide hole in the first lateral side is coaxial with the another locking pin guide hole in the second lateral side;
the another locking pin passes through the another locking pin guide hole in the first lateral side and the another locking pin guide hole in the second lateral side;
the at least one locking pin has a locking pin second end having a conical structure defining a conical surface;
the another locking pin has a locking pin second end having a conical structure defining a conical surface;
the locking hole in the lower anti-detachment hook ring is an obround locking hole; and
the at least one locking pin and the another locking pin are insertable together into the obround locking hole, whereby conical surfaces on the at least one locking pin and the another locking pin are in tight contact with arc edges at two ends of the obround locking hole.

\* \* \* \* \*